United States Patent
Xu et al.

(10) Patent No.: US 12,450,704 B2
(45) Date of Patent: Oct. 21, 2025

(54) MACHINE LEARNING MODEL TRAINING USING SYNTHETIC DATA FOR UNDER-DISPLAY CAMERA (UDC) IMAGE RESTORATION

(71) Applicant: Samsung Electronics Co., Ltd., Suwon-si (KR)

(72) Inventors: Yibo Xu, Plano, TX (US); Weidi Liu, Houston, TX (US); Hamid R. Sheikh, Allen, TX (US); John Seokjun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 18/045,696

(22) Filed: Oct. 11, 2022

(65) Prior Publication Data

US 2024/0119570 A1    Apr. 11, 2024

(51) Int. Cl.
*G06T 5/00*    (2024.01)
*G06T 5/20*    (2006.01)
(Continued)

(52) U.S. Cl.
CPC .................. *G06T 5/73* (2024.01); *G06T 5/20* (2013.01); *G06T 5/50* (2013.01);
(Continued)

(58) Field of Classification Search
CPC . G06T 2207/20084; G06T 2207/20081; G06T 5/60; G06T 5/73; G06T 5/00; G06V 10/82; G06V 10/60; G06V 10/774
See application file for complete search history.

(56) References Cited

U.S. PATENT DOCUMENTS 6,173,085 B1    1/2001  Hamilton, Jr. et al.
7,809,208 B2   10/2010  Kang
(Continued)

FOREIGN PATENT DOCUMENTS

CN    116416310 A  *  7/2023
EP      2975850 A1     1/2016
(Continued)

OTHER PUBLICATIONS

Zhou, Yuqian, et al. "Image restoration for under-display camera." Proceedings of the ieee/cvf conference on computer vision and pattern recognition. 2021.*
(Continued)

*Primary Examiner* — Li Liu

(57) ABSTRACT

A method includes identifying, using at least one processing device of an electronic device, a spatially-variant point spread function associated with an under-display camera. The spatially-variant point spread function is based on an optical transmission model and a layout of a display associated with the under-display camera. The method also includes generating, using the at least one processing device, a ground truth image. The method further includes performing, using the at least one processing device, a convolution of the ground truth image based on the spatially-variant point spread function in order to generate a synthetic sensor image. The synthetic sensor image represents a simulated image captured by the under-display camera. In addition, the method includes providing, using the at least one processing device, the synthetic sensor image and the ground truth image as an image pair to train a machine learning model to perform under-display camera point spread function inversion.

22 Claims, 9 Drawing Sheets

(51) Int. Cl.
  *G06T 5/50* (2006.01)
  *G06T 5/73* (2024.01)
  *H04N 23/50* (2023.01)

(52) U.S. Cl.
  CPC .............. *G06T 2207/10024* (2013.01); *G06T 2207/20081* (2013.01); *H04N 23/50* (2023.01)

(56) References Cited

U.S. PATENT DOCUMENTS

| | | |
|---|---|---|
| 8,737,761 B2 | 5/2014 | Zhang et al. |
| 9,374,478 B1 | 6/2016 | Li |
| 9,412,152 B2 | 8/2016 | Chen et al. |
| 9,883,112 B1 | 1/2018 | Igor' Valer'Evich |
| 9,883,125 B2 | 1/2018 | Li et al. |
| 10,074,162 B2 | 9/2018 | El Mezeni |
| 10,282,822 B2 | 5/2019 | Shmunk et al. |
| 10,453,185 B2 | 10/2019 | Dal Mutto et al. |
| 10,628,925 B2 | 4/2020 | Maalouf et al. |
| 11,272,106 B1 | 3/2022 | Lee et al. |
| 2004/0057630 A1 | 3/2004 | Schuhrke et al. |
| 2008/0030587 A1 | 2/2008 | Helbing |
| 2008/0298712 A1 | 12/2008 | Kang |
| 2008/0317378 A1 | 12/2008 | Steinberg et al. |
| 2009/0034863 A1 | 2/2009 | Kisilev et al. |
| 2010/0002952 A1 | 1/2010 | Oizumi et al. |
| 2011/0123133 A1 | 5/2011 | Mohanty et al. |
| 2011/0149163 A1 | 6/2011 | Nishi et al. |
| 2011/0285726 A1* | 11/2011 | Redmann ............ H04N 9/3102 345/467 |
| 2012/0281132 A1 | 11/2012 | Ogura et al. |
| 2014/0176592 A1 | 6/2014 | Wilburn et al. |
| 2014/0185952 A1 | 7/2014 | Cabral |
| 2014/0307978 A1 | 10/2014 | Balestrieri |
| 2014/0341481 A1 | 11/2014 | Panetta et al. |
| 2015/0036943 A1 | 2/2015 | Lin |
| 2016/0140697 A1 | 5/2016 | Sugimoto et al. |
| 2017/0061586 A1 | 3/2017 | Uliyar et al. |
| 2017/0061590 A1 | 3/2017 | Chamaret et al. |
| 2017/0064204 A1 | 3/2017 | Sapiro et al. |
| 2018/0114296 A1 | 4/2018 | Chuang et al. |
| 2018/0158175 A1 | 6/2018 | Shmunk et al. |
| 2019/0213383 A1 | 7/2019 | Matsunami |
| 2019/0213717 A1 | 7/2019 | Oniki |
| 2019/0385288 A1 | 12/2019 | Stewart |
| 2020/0265567 A1 | 8/2020 | Hu et al. |
| 2020/0389575 A1 | 12/2020 | Gove |
| 2021/0152735 A1 | 5/2021 | Zhou et al. |
| 2021/0281813 A1 | 9/2021 | Vyas et al. |
| 2022/0005157 A1 | 1/2022 | Shu et al. |
| 2022/0005159 A1 | 1/2022 | Guan et al. |
| 2022/0067889 A1 | 3/2022 | Kang et al. |
| 2022/0138924 A1 | 5/2022 | Kwon et al. |
| 2022/0207658 A1 | 6/2022 | Tong et al. |
| 2023/0306561 A1 | 9/2023 | Kusumi |

FOREIGN PATENT DOCUMENTS

| | | |
|---|---|---|
| JP | 6111489 B2 | 4/2017 |
| JP | 6500638 B2 | 4/2019 |
| JP | 2019121187 A | 7/2019 |
| KR | 10-2363030 B1 | 2/2022 |
| KR | 10-2022-0028962 A | 3/2022 |
| KR | 10-2022-0029310 A | 3/2022 |
| KR | 10-2022-0058143 A | 5/2022 |
| WO | 2021102705 A1 | 6/2021 |
| WO | 2022119372 A1 | 6/2022 |
| WO | 2022170048 A2 | 8/2022 |
| WO | WO-2023211742 A1 * | 11/2023 |

OTHER PUBLICATIONS

Kwon, Kinam, et al. "Controllable image restoration for under-display camera in smartphones." Proceedings of the IEEE/CVF Conference on Computer Vision and Pattern Recognition. 2021.*

Madhusudana, Pavan C., Seok-Jun Lee, and Hamid R. Sheikh. "Revisiting dead leaves model: Training with synthetic data." IEEE Signal Processing Letters 29 (2021): 209-213.*

Yang et al., "Residual and Dense UNet for Under-display Camera Restoration," Computer Vision—ECCV 2020 Workshops, Aug. 2020, 11 pages.

Kwon et al., "Controllable Image Restoration for Under-Display Camera in Smartphones," 2021 IEEE/CVF Conference on Computer Vision and Pattern Recognition, Jun. 2021, 10 pages.

Zhou et al., "Image Restoration for Under-Display Camera," 2021 IEEE/CVF Conference on Computer Vision and Pattern Recognition, Jun. 2021, 10 pages.

International Search Report and Written Opinion of the International Searching Authority regarding International Patent Application No. PCT/KR2021/020345 dated Apr. 14, 2022, 9 pages.

Bilcu et al., "Constrained Unsharp Masking for Image Enhancement," 2008 International Conference on Image and Signal Processing, 2008, 10 pages.

Kwon et al., "Controllable Image Restoration for Under-Display Camera in Smartphones," 2021 IEEE/CVF Conference on Computer Vision and Pattern Recognition (CVPR), Jun. 2021, 10 pages.

Romano et al., "RAISR: Rapid and Accurate Image Super Resolution," IEEE Transactions on Computational Imaging, vol. 3, No. 1, Jan. 2017, 31 pages.

Yang et al., "Residual and Dense UNet for Under-display Camera Restoration," Computer Vision—ECCV, Jan. 2021, 11 pages.

Zhou et al., "Image Restoration for Under-Display Camera," 2021 IEEE/CVF Conference on Computer Vision and Pattern Recognition (CVPR), Mar. 2020, 10 pages.

International Search Report and Written Opinion of the International Searching Authority dated Oct. 19, 2023 in connection with International Patent Application No. PCT/KR2023/010204, 20 pages.

Non-Final Office Action dated Apr. 11, 2025 in connection with U.S. Appl. No. 18/049,213, 10 pages.

* cited by examiner

702

704

MACHINE LEARNING MODEL TRAINING USING SYNTHETIC DATA FOR UNDER-DISPLAY CAMERA (UDC) IMAGE RESTORATION

TECHNICAL FIELD

This disclosure relates generally to machine learning and image processing systems. More specifically, this disclosure relates to machine learning model training using synthetic data for under-display camera (UDC) image restoration.

BACKGROUND

Under-display cameras (UDCs) are being used in various mobile electronic devices and other electronic devices, such as smartphones and tablet computers. An under-display camera refers to a camera positioned underneath a display of an electronic device. Often times, an under-display camera can be used as a forward-facing camera to capture still or video images of a user of an electronic device. This approach helps to obscure the camera and reduce or eliminate the need to include circular, pill-shaped, notched, or other cutouts in a display. Due to optical diffraction and noise generated by having a display in front of a camera lens, image restoration is performed in order to improve the quality of images captured by an under-display camera.

SUMMARY

This disclosure relates to machine learning model training using synthetic data for under-display camera (UDC) image restoration.

In a first embodiment, a method includes identifying, using at least one processing device of an electronic device, a spatially-variant point spread function associated with an under-display camera. The spatially-variant point spread function is based on an optical transmission model and a layout of a display associated with the under-display camera. The method also includes generating, using the at least one processing device, a ground truth image. The method further includes performing, using the at least one processing device, a convolution of the ground truth image based on the spatially-variant point spread function in order to generate a synthetic sensor image. The synthetic sensor image represents a simulated image captured by the under-display camera. In addition, the method includes providing, using the at least one processing device, the synthetic sensor image and the ground truth image as an image pair to train a machine learning model to perform under-display camera point spread function inversion.

In a second embodiment, an apparatus includes at least one processing device configured to identify a spatially-variant point spread function associated with an under-display camera. The spatially-variant point spread function is based on an optical transmission model and a layout of a display associated with the under-display camera. The at least one processing device is also configured to generate a ground truth image. The at least one processing device is further configured to perform a convolution of the ground truth image based on the spatially-variant point spread function in order to generate a synthetic sensor image. The synthetic sensor image represents a simulated image captured by the under-display camera. In addition, the at least one processing device is configured to provide the synthetic sensor image and the ground truth image as an image pair to train a machine learning model to perform under-display camera point spread function inversion.

In a third embodiment, a non-transitory computer readable medium contains instructions that when executed cause at least one processor to identify a spatially-variant point spread function associated with an under-display camera. The spatially-variant point spread function is based on an optical transmission model and a layout of a display associated with the under-display camera. The non-transitory computer readable medium also contains instructions that when executed cause the at least one processor to generate a ground truth image. The non-transitory computer readable medium further contains instructions that when executed cause the at least one processor to perform a convolution of the ground truth image based on the spatially-variant point spread function in order to generate a synthetic sensor image. The synthetic sensor image represents a simulated image captured by the under-display camera. In addition, the non-transitory computer readable medium contains instructions that when executed cause the at least one processor to provide the synthetic sensor image and the ground truth image as an image pair to train a machine learning model to perform under-display camera point spread function inversion.

In a fourth embodiment, a method includes obtaining, using at least one processing device of an electronic device, an input image captured by an under-display camera. The method also includes processing, using the at least one processing device, the input image using a trained machine learning model to reduce blur and generate an output image based on the input image. The trained machine learning model is trained to perform an under-display camera point spread function inversion using an image pair having (i) a ground truth image and (ii) a synthetic sensor image generated by performing a convolution of the ground truth image based on a spatially-variant point spread function. The spatially-variant point spread function is based on an optical transmission model and a layout of a display positioned over the under-display camera.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (Cl)), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (MR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor." or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
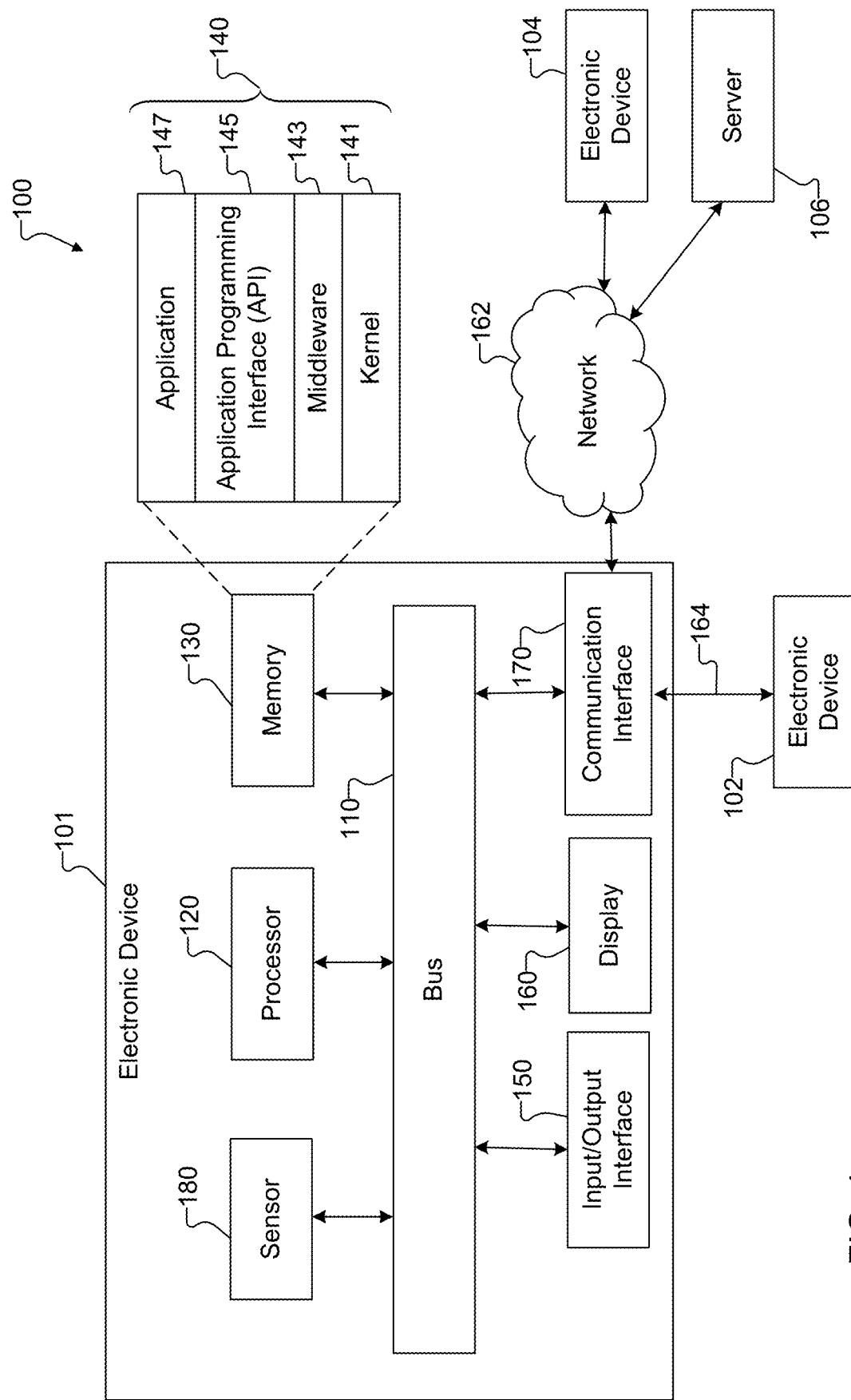
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, under-display cameras (UDCs) are being used in various mobile electronic devices and other electronic devices, such as smartphones and tablet computers. An under-display camera refers to a camera positioned underneath a display of an electronic device. Often times, an under-display camera can be used as a forward-facing camera to capture still or video images of a user of an electronic device. This approach helps to obscure the camera and reduce or eliminate the need to include circular, pill-shaped, notched, or other cutouts in a display. Due to optical diffraction and noise generated by having a display in front of a camera lens, image restoration is performed in order to improve the quality of images captured by an under-display camera.

In some cases, deep learning networks or neural networks are being investigated for use in performing UDC image restoration. These deep learning networks or neural networks typically require large real datasets in order to be trained effectively in performing UDC image restoration. However, constructing a training dataset with real image pairs for under-display cameras is a challenging task. Among other things, it is difficult, time-consuming, and costly to capture and label real image pairs for use in training a deep learning network or neural network. Moreover, the real image pairs typically include an image captured by an actual under-display camera and an image captured by a different camera that is not obscured. Capturing different images using different cameras often results in subtle or significant differences in the images, such as due to object motion or different positions of the cameras. These differences can negatively impact or even prevent training of a deep learning network or neural network. Further, various attempts to simulate the effects of a display on an under-display camera assume that blur created by the display is constant, which is not always the case. In addition, the primary optical diffraction to light captured by an under-display camera is the display itself, and the actual layout of a display can vary (such as due to display technology advancements and varying designs of wiring used in or with the displays). As a result, even if a deep learning network or neural network can be trained to effectively remove blur caused by one display, the same deep learning network or neural network cannot be used with a different display having a different layout.

This disclosure provides techniques for machine learning model training using synthetic data for UDC image restoration. As described in more detail below, one or more ground truth images can be generated, and one or more corresponding training images (also referred to as synthetic sensor images) can be generated using the ground truth image(s). Each synthetic sensor image represents an image that is simulated as being captured by an under-display camera. In some cases, each ground truth image may be a synthetic image, such as a synthetic image generated using a "dead leaves" model and one or more natural images. The synthetic sensor image(s) can be generated by performing one or more convolutions of the ground truth image(s) based on a spatially-variant point spread function (also referred to as a blur kernel). The spatially-variant point spread function is associated with the under-display camera and can be based on an optical transmission model and a layout of a display associated with the under-display camera. In some cases, the optical transmission model can model the structure of the under-display camera (such as by using a lens and an imaging sensor), and the spatially-variant point, spread function can be determined based on how light may interact with the display and the lens before striking the imaging sensor.

Once one or more ground truth images and one or more corresponding training images are obtained, one or more image pairs can be used during training of a machine learning model, where the machine learning model is trained to perform under-display camera point spread function inversion. This trains the machine learning model to reduce or minimize blur created by the presence of the display over the under-display camera. The trained machine learning model may be placed into operation for use during inferencing, such as by deploying the trained machine learning model to one or more end user devices so that the trained machine learning model can be applied to actual images captured using one or more actual under-display cameras.

In this way, it is possible to effectively train a machine learning model to perform UDC, image restoration using partially- or completely-synthetic training data. As a result, the training data can be obtained in a much more timely and cost-effective manner and with much less effort. Moreover, these techniques avoid using images from different cameras as image pairs in the training data, which can eliminate problems associated with moving objects within scenes or using images captured from slightly different perspectives. Further, these approaches can easily incorporate spatial variations in blur that may be created by a display positioned over an under-display camera. In addition, these techniques can be used to easily create training data and train machine learning models for use with different displays, enabling application of trained machine learning models for use with a wide variety of under-display cameras used with a wide variety of display layouts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to generate training data and train one or more machine learning models for use during UDC image restoration. Also or alternatively, the processor 120 may be used to apply one or more trained machine learning models during UDC image restoration.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for generating training data and training one or more machine learning models for use during UDC image restoration. Also or alternatively, the application 147 may include one or more applications for applying one or more trained machine learning models during UDC image restoration. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (OLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and, may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The one or more cameras or other imaging sensors include one or more under-display cameras, each of which represents a camera positioned under the display 160. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LIE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UNITS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101, For example, the server 106 can include a processing module or processor that may support the processor 120 implemented in the electronic device 101. As described below, the server 106 may be used to generate training data and train one or more machine learning models for use during UDC image restoration. Also or alternatively, the server 106 may be used to apply one or more trained machine learning models during UDC image restoration.

Although FIG. 1 illustrates one example of a network configuration 100 including an electronic device 101, various changes may be made to FIG. 1 example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
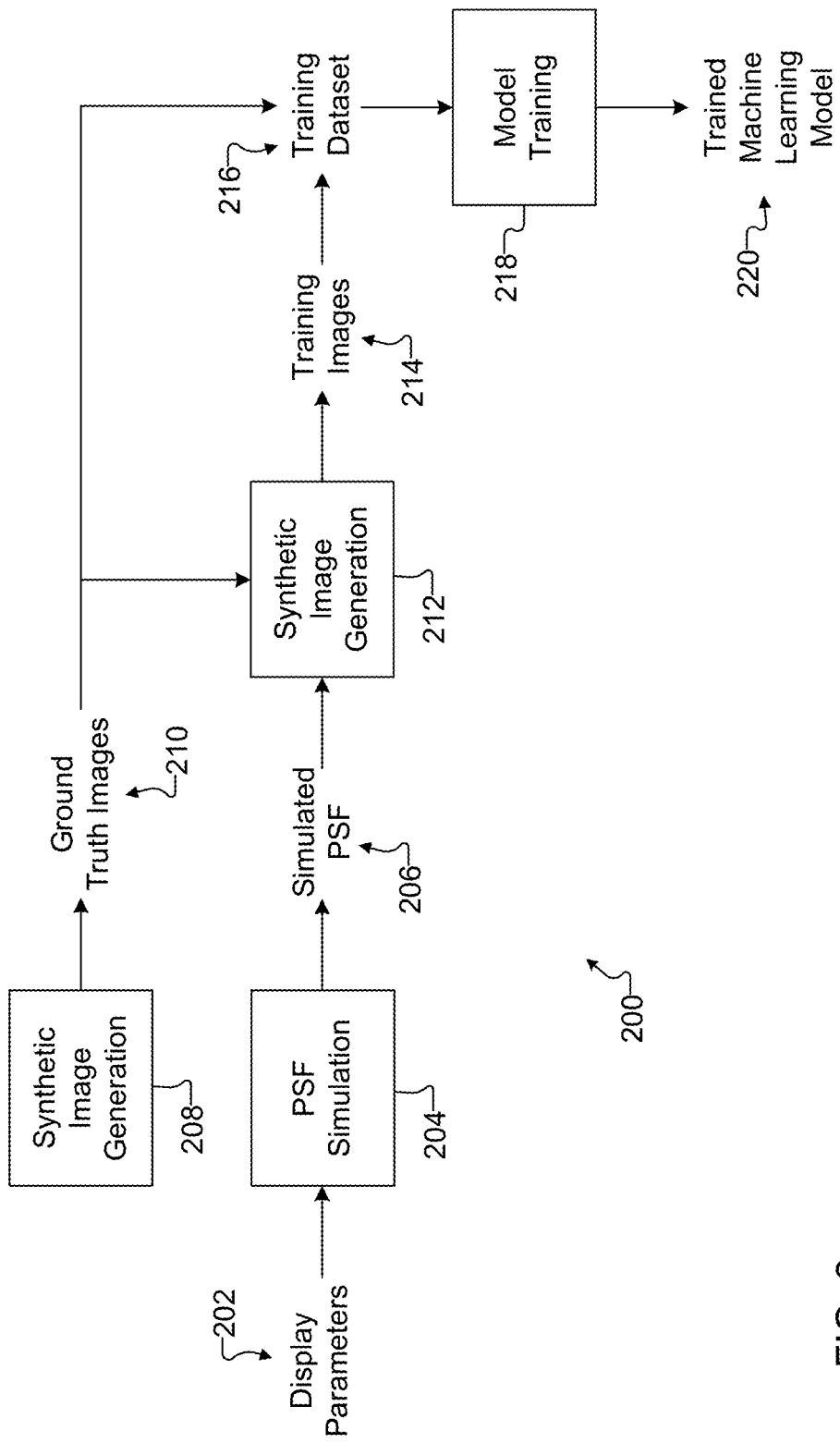
FIG. 2 illustrates an example architecture for generating training data and training a machine learning model to perform under-display camera (UDC) image restoration in accordance with this disclosure.

FIG. 2 illustrates an example architecture 200 for generating training data and training a machine learning model to perform UDC image restoration in accordance with this disclosure. For ease of explanation, the architecture 200 shown in FIG. 2 is described as being implemented on or supported by the server 106 in the network configuration 100 of FIG. 1. However, the architecture 200 shown in FIG. 2 could be used with any other suitable device(s) and in any other suitable system(s), such as when the architecture 200 is implemented on or supported by the electronic device 101.

As shown in FIG. 2, the architecture 200 receives one or more display parameters 202, which represent one or more characteristics of the design of a display to be used with an under-display camera. For example, the one or more display parameters 202 may include an image file (such as a PNG or other binary file) that represents the layout or other physical structure of the display to be used with an under-display camera. In some cases, for instance, the display 160 may have a design that represents a repeating pattern, such as when the same pattern repeats in a grid (meaning the pattern is replicated in rows and columns of the display 160). In those cases, the one or more display parameters 202 may include an image of the pattern within a single portion of the display, and it can be assumed that the remaining portions of the display include the same repeating pattern. However, the layout or other physical structure of the display to be used with an under-display camera may be defined in any other suitable manner.

The one or more display parameters 202 are provided to a PSF simulation function 204, which generally operates to perform one or more simulations in order to identify at least one simulated point spread function 206 for the display to be used with an under-display camera. The point spread function 206 estimates the blur that can be created when light passes through the display to the under-display camera. For example, the PSF simulation function 204 can use an optical transmission model that models the structure of the under-display camera. As a particular example, the optical transmission model can model the structure of the under-display camera using a lens and an imaging sensor. The PSF simulation function 204 can use this modeled structure of the under-display camera and the one or more display parameters 202 defining the layout or other structure of the display to be used with the under-display camera in order to simulate how light is modified (and possibly blurred) while passing through the display and the lens before striking the imaging sensor of the under-display camera. As described below, this can depend on various factors, such as a distance between the display and the lens and a distance between the lens and the imaging sensor.

Overall, the PSF simulation function 204 can be used to identify how blurring is created by a display having a design as specified by the display parameter(s) 202 when light passes through such a display to an under-display camera. The PSF simulation function 204 can perform this function for any suitable display design, such as for displays 160 having different physical layouts or other physical design parameters that affect light. Moreover, the PSF simulation function 204 can perform this function regardless of the angle of incident light on the display. In addition, the point spread function 206 can represent a spatially-variant point spread function, which means that the blurring represented by the point spread function 206 can differ depending on the location of the display.

The architecture 200 also includes a synthetic image generation function 208, which generally operates to produce one or more ground truth images 210. Each ground truth image 210 represents an image to be used during machine learning model training, where an output from the machine learning model being trained is compared to the ground truth image 210 in order to determine whether the machine learning model needs to be adjusted. The synthetic image generation function 208 can use any suitable technique to generate the ground truth image(s) 210. In some embodiments, the synthetic image generation function 208 uses a "dead leaves" model in which the "leaves" of each ground truth image 210 are approximated using circular discs with random textures and in which one or more color distributions of the leaves are based on one or more natural color distributions of natural image samples from at least one natural image. However, any other suitable technique may be used to produce the ground truth images 210, such as when the ground truth images 210 are generated using one or more generative adversarial networks, generated using one or more transformer-based neural networks, or generated by performing random natural object and background fusion. Also note that any suitable number of ground truth images 210 can be generated here.

The ground truth image(s) 210 and the at least one simulated point spread function 206 are provided to another synthetic image generation function 212, which generally operates to produce one or more training images 214. Each training image 214 represents an image that may be provided to a machine learning model during training so that the machine learning model can generate an output that is compared against the associated ground truth image 210. For example, the synthetic image generation function 212 can perform at least one convolution of each ground truth image 210 based on the point spread function 206 in order to generate a corresponding training image 214 (a synthetic sensor image). By applying the point spread function 206 to the ground truth image 210, this modifies the ground truth image 210 based on the blur that is expected to occur when light passes through a display prior to reaching an under-display camera. In other words, the training image 214 represents a simulated image that might be captured by the under-display camera, assuming the under-display camera was being used to capture an image of a scene as defined by the associated ground truth image 210 and as modified by the optical diffraction and noise from the display over the under-display camera.

Each training image 214 and its associated ground truth image 210 can form an image pair that is included in at least one training dataset 216. The training dataset 216 is used by a model training function 218 to train at least one machine learning model 220. During the training process, the training images 214 are provided to a machine learning model being trained, and the machine learning model processes the training images 214 in order to generate output images. Each output image is compared to the associated ground truth image 210, and differences between the output image produced by the machine learning model and the ground truth image 210 are identified and used to compute a loss value. The loss value is representative of the errors in the operation of the machine learning model being trained. Various weights or other parameters of the machine learning model can be modified based on the computed loss values, and the training images 214 can again be processed by the machine learning model so that additional output images are generated and compared to the ground truth images 210. Ideally, the machine learning model improves over time and produces output images that are more and more similar to the ground truth images 210. This iterative process can continue until the machine learning model generates output images having a suitably low loss or until some other criterion or criteria are met (such as a specified number of training iterations completing or a specified amount of training time elapsing).

Here, the machine learning model 220 is trained to reduce or minimize blur contained in the training images 214, where that blur was artificially created based on the expected blurring from the layout or other physical structure of a display over an under-display camera. Effectively, the machine learning model 220 is trained here to perform point spread function inversion, which means that the machine learning model 220 is trained to attempt to invert the blurring caused by light passing through a display positioned over an under-display camera. This allows the machine learning model 220 to be trained to perform UDC image restoration, where the point spread function inversion removes at least a substantial portion of the blur caused by light passing through the display positioned over the under-display camera. This helps images generated using the under-display camera to appear as if they were captured by a camera not positioned under the display. Images generated by the trained machine learning model 220 can therefore have little or no blur created by the presence of the display over the under-display camera.

In this way, a machine learning model 220 can be trained to effectively reduce or minimize blur created by positioning a camera under a display. Moreover, this process can be easily modified to account for different layouts or other physical designs of different displays, thereby allowing machine learning models 220 to be trained to perform UDC image restoration for different cameras positioned under different types of displays. Further, in some cases, the training dataset 216 can be formed using only synthetic images, meaning only images that are artificially generated and not images captured of real scenes. Since the training dataset 216 can be generated artificially in a manner that accounts for the specific design of a display to be used with an under-display camera, this can significantly speed up the process of obtaining training data for a machine learning model.

In addition, various types of machine learning model architectures may be used as or with the machine learning model 220, such as a convolutional neural network (CNN), deep neural network (DNN), other type of neural network, or other type of machine learning model. Since the architecture 200 here provides a much faster and easier approach for training machine learning models, it is possible for multiple (and possibly numerous) machine learning model architectures to be designed and trained so that the machine learning model or models that provide the best results can be selected for subsequent use. Finally, since the training dataset 216 may be fully generated synthetically, it is possible for the images in the training dataset 216 to be within any specified color space (such as the RGB, sRGB, YUV, or RAW image space) and have any desired bit-depth (such as when the image data includes 8-bit, 12-bit, or 16-bit data values).

It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, the functions shown in or described with respect to FIG. 2 can be performed by a single device or by multiple devices.

Although FIG. 2 illustrates one example of an architecture 200 for generating training data and training a machine learning model to perform UDC image restoration, various changes may be made to FIG. 2. For example, various components in FIG. 2 may be combined, further subdivided, replicated, or rearranged and additional components may be added according to particular needs. Also, any suitable number of image pairs formed by training images 214 and ground truth images 210 may be produced here and used for machine learning model training.

Figure 3:
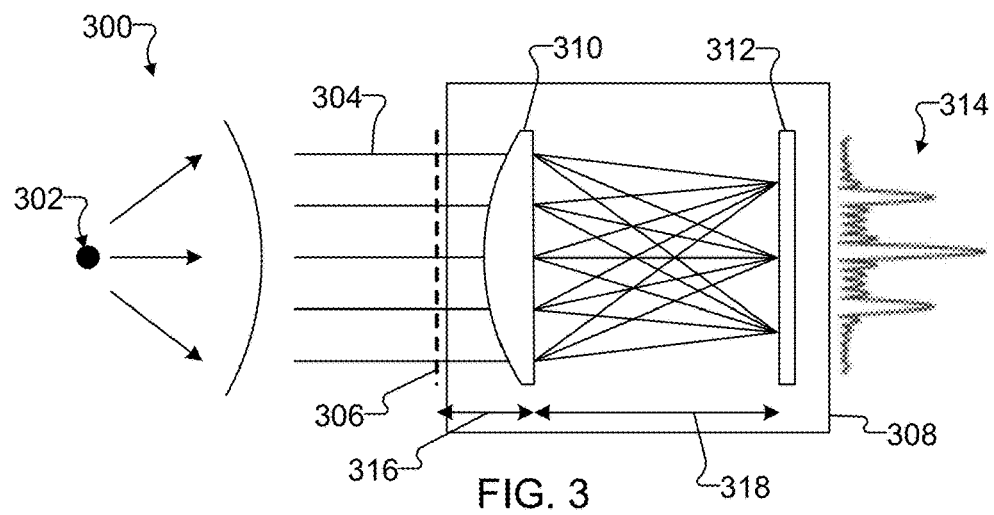
FIG. 3 illustrates an example optical transmission model used in the architecture of FIG. 2 in accordance with this disclosure.

FIG. 3 illustrates an example optical transmission model 300 used in the architecture 200 of FIG. 2 in accordance with this disclosure. For example, the optical transmission model 300 may be used by the PSF simulation function 204 in order to simulate how light passing through a display to an under-display camera is blurred. As shown in FIG. 3, the optical transmission model 300 assumes that incoming light is received from a simulated point source 302. The simulated point source 302 in this example is assumed to produce light that is temporally and spatially incoherent. Light rays 304 from the simulated point source 302 in this particular example are generally assumed to be parallel, and these light rays 304 are assumed to pass through a display 306 (which may represent a specific design of the display 160) and into an under-display camera 308 (which may represent a specific imaging sensor 180). The point source 302 is also assumed to lie on an optical axis of the under-display camera 308 in this example.

The under-display camera 308 in this example is modeled using a lens 310 (such as a thin lens) and an imaging sensor 312. The light rays 304 pass though the display 306 and the lens 310, and the display 306 and the lens 310 collectively cause at least some of the light rays 304 to change paths (or in some cases be blocked). This causes the light rays 304 to strike the imaging sensor 312 in a non-ideal manner, namely because blurring can be created by passage of the light rays 304 through the display 306 and the lens 310. In this example, the simulated light rays 304 striking the imaging sensor 312 can be used to generate a point spread function 314, which represents the blurring created by the presence of the display 306 over the under-display camera 308. The point spread function 314 can be determined or expressed in any suitable manner. In some cases, for instance, the point spread function 314 is determined using an absolute square of a wavefront of light from the simulated point source 302 passing through the display 306 and the lens 310 and striking the imaging sensor 312.

In some embodiments, it may be assumed that the display 306 has a zero thickness, and it may be assumed that an aperture through which the light rays 304 enter an electronic device or the under-display camera 308 has a zero thickness. These assumptions can help to simplify the simulation of the operation of an electronic device that includes the display 306 and the under-display camera 308. However, other simulations may not make these assumptions. Also, in this example, there is a gap 316 between the display 306 and the lens 310 of the under-display camera 308, and there is a gap 318 between the lens 310 and the imaging sensor 312 of the under-display camera 308. The point spread function 314 for the under-display camera 308 here varies based on these two gaps 316 and 318 since these gaps can affect the blurring of the light rays 304. In some cases, the gap 316 may range from about 0.3 millimeters to about 1.0 millimeters (inclusive), and the gap 318 may range from about 21.0 millimeters to about 27.0 millimeters (inclusive). However, these values are for illustration only and can easily vary based on the specific design being used.

Although FIG. 3 illustrates one example of an optical transmission model 300 used in the architecture 200 of FIG. 2 various changes may be made to FIG. 3. For example, an under-display camera 308 may be modeled in any other suitable manner, such as by using multiple lenses 310 or different point sources 302. Also, while the point source 302 is shown here as being on the optical axis of the under-display camera 308, the optical transmission model 300 can similarly be used to generate point spread functions based on other incident light angles.

Figure 4A:
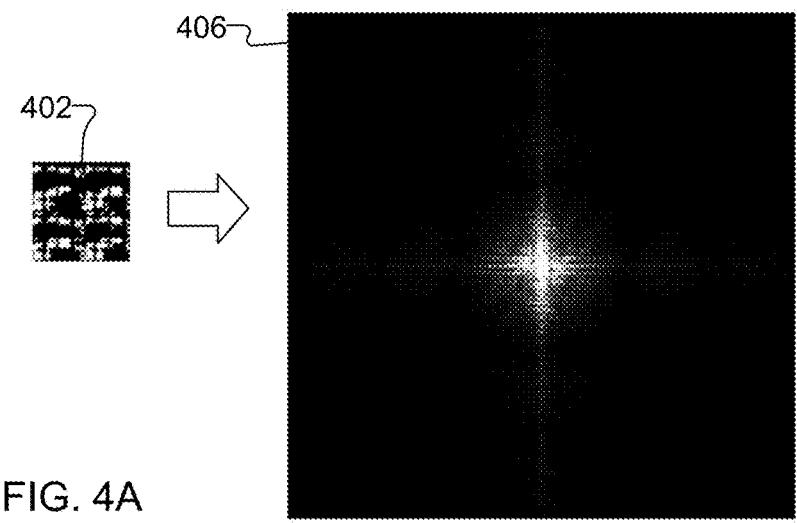
FIGS. 4A and 4B illustrate example display grid patterns and corresponding point spread functions in accordance with this disclosure.
Figure 4B:
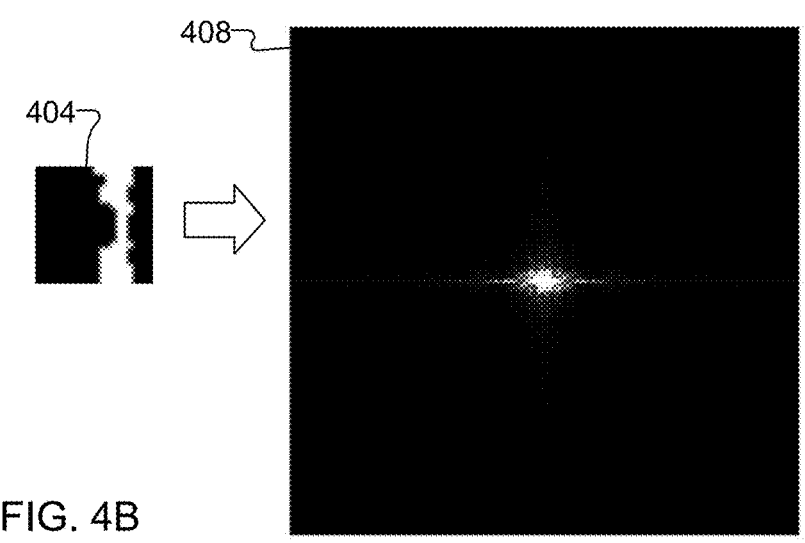

FIGS. 4A and 4B illustrate example display grid patterns 402, 404 and corresponding point spread functions 406, 408 in accordance with this disclosure. For example, the display grid patterns 402, 404 may represent repeating patterns used in the display 160 or 306 described above, and the point spread functions 406, 408 may represent the point spread functions 206 or 314 described above.

As described above, in some cases, the layout or other physical construction of a display 160 or 306 can be described using a grid containing a repeating pattern. In that case, the optical transmission model 300 can be constructed using a display grid pattern 402 or 404, which may be defined in a PNG or other binary file in some embodiments. An input can also be received identifying an aperture size and the size of the display or the display grid pattern 402 or 404, such as when the input includes information defining the size of each cell (the size of one instance of the display grid pattern 402 or 404) or the overall size of the display 160 or 306 and the number of cells containing the display grid pattern 402 or 404 horizontally and vertically in the display 160 or 306. Using the actual layout of the display 160 or 306, it is possible to simulate how light interacts with the display 160 or 306 and the under-display camera 308 in order to determine the appropriate point spread function 406 or 408. In some cases, the appropriate point spread function 406 or 408 can be generated even before any display 160 or 306 having the display grid pattern 402 or 404 is actually manufactured. This is because the point spread functions 406, 408 can be generated to realistically act as good estimations of the image quality of light passing through different types of displays.

As can be seen here, different display grid patterns 402 and 404 can result in different point spread functions 406 and 408 being identified by the PSF simulation function 204. This is because the different display grid patterns 402 and 404 will alter light passing through the displays 160 or 306 differently, resulting in different blur kernels being created. However, using knowledge of the different display grid patterns 402 and 404, the PSF simulation function 204 can use the optical transmission model 300 and other information in order to simulate how the light rays 304 can be affected by the different display grid patterns 402 and 404, allowing suitable point spread functions 406 and 408 to be generated. As described above, each point spread function 406 and 408 may be used to modify ground truth images 210 in order to simulate the types of images that might be captured by an under-display camera 308. This generates training images 214, and the ground truth images 210 and the training images 214 can be used as image pairs during training of a suitable machine learning model 220 to perform UDC image restoration. As a result, different machine learning models 220 can be trained to perform UDC image restoration for displays having different display grid patterns 402 and 404.

Figure 5:
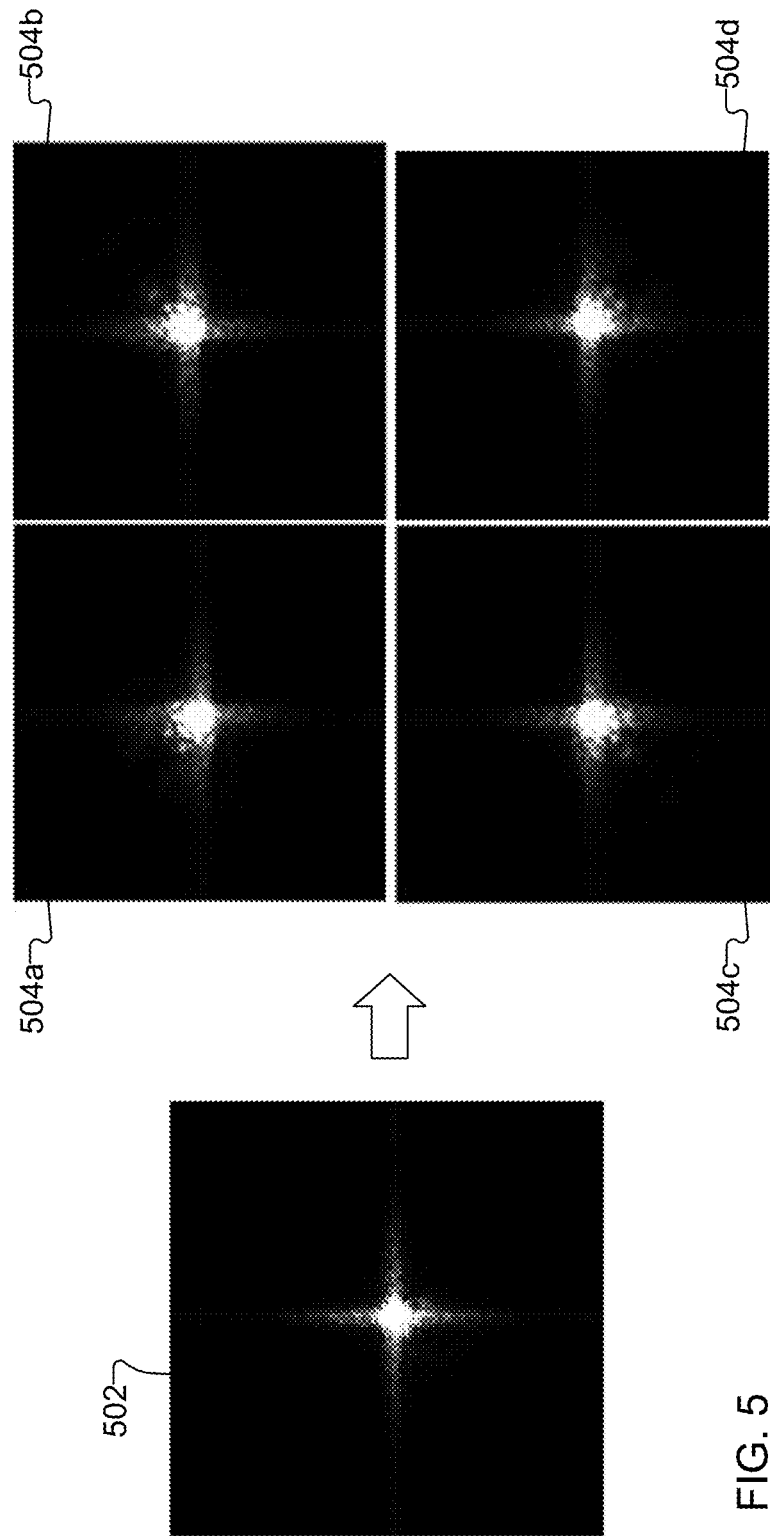
FIG. 5 illustrates an example display grid pattern and a corresponding spatially-variant point spread function in accordance with this disclosure.

Moreover, as noted above, the PSF simulation function 204 has the ability to generate spatially-variant point spread functions, which means that a point spread function can vary based on location of the display 306 or imaging sensor 312. FIG. 5 illustrates an example display grid pattern 502 and a corresponding spatially-variant point spread function 504a-504d in accordance with this disclosure. Again, the display grid pattern 502 may represent a repeating pattern used in the display 160 or 306 described above, and the point spread function 504a-504d may represent one of the point spread functions 206 or 314 described above. Here, the spatially-variant point spread function 504a-504d is shown for four corners of a display, and the spatially-variant point spread function 504a-504d is clearly non-uniform (indicating that blur is not constant is these four corners of the display). This non-uniformity of the point spread function can be obtained in various ways. For instance, in some embodiments, the PSF simulation function 204 can consider the effects of spherical aberration, primary coma aberration, and primary astigmatism aberration on the light rays 304 based on the field-of-view of the under-display camera 308.

Although FIGS. 4A, 4B, and 5 illustrate examples of display grid patterns and corresponding point spread functions, various changes may be made to FIGS. 4A, 4B, and 5. For example, the display grid patterns shown here are examples only and can easily vary depending on the specific display being used. Also, the corresponding point spread functions shown here can easily vary based on various design parameters of an electronic device, display, or under-display camera (such as one or more distances defining one or more of the gaps 316 and 318 described above).

Figure 6:
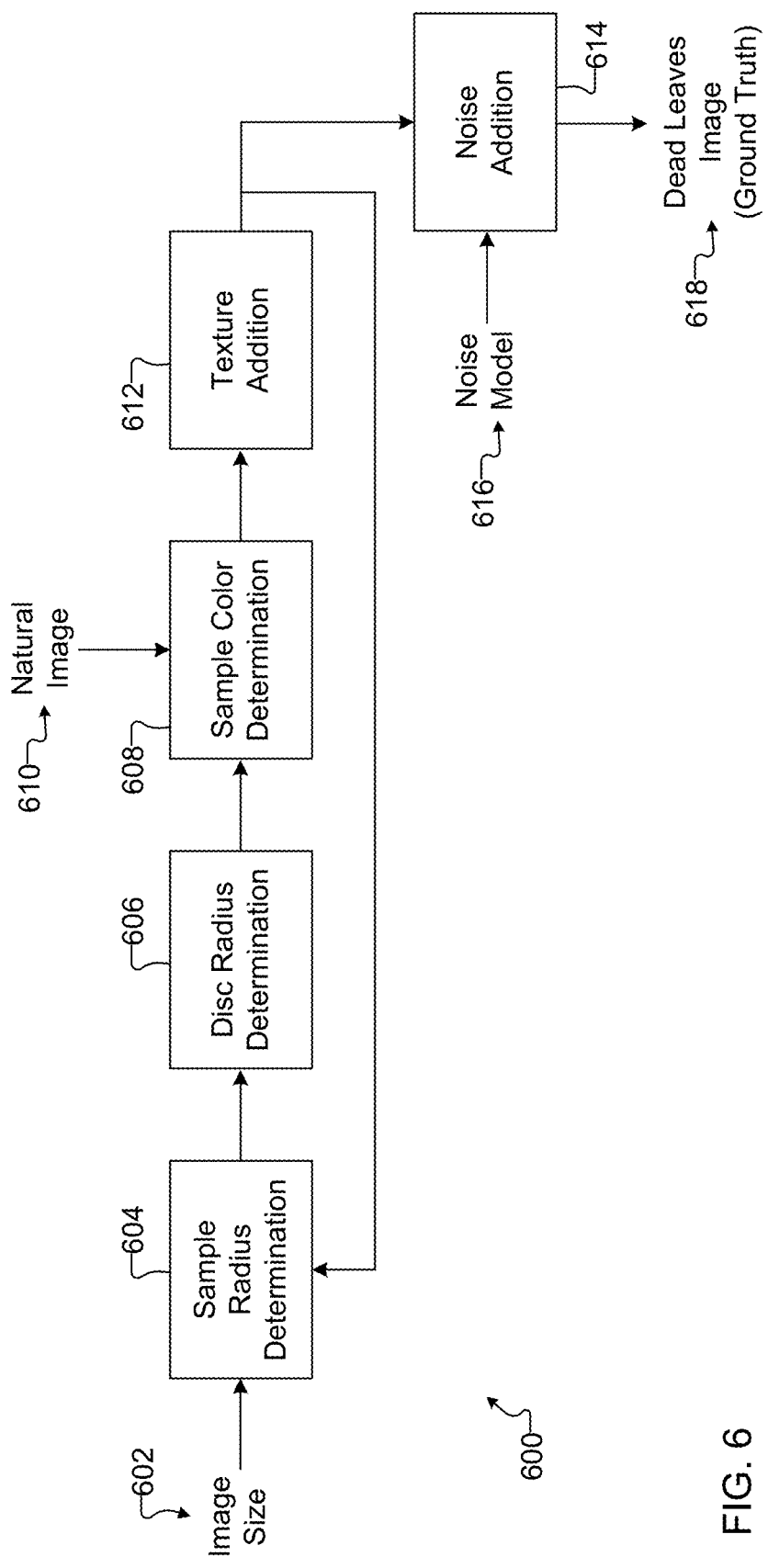
FIG. 6 illustrates an example architecture for generating synthetic ground truth images using a dead leaves model in accordance with this disclosure.

FIG. 6 illustrates an example architecture 600 for generating synthetic ground truth images using a dead leaves model in accordance with this disclosure. The architecture 600 may, for example, be used within the synthetic image generation function 208 of FIG. 2. For ease of explanation, the architecture 600 shown in FIG. 6 is described as being implemented on or supported by the server 106 in the network configuration 100 of FIG. 1. However, the architecture 600 shown in FIG. 6 could be used with any other suitable device(s) and in any other suitable system(s), such as when the architecture 600 is implemented on or supported by the electronic device 101.

In general, a dead leaves model can be used to produce synthetic ground truth images by performing a sequential superimposition of random closed sets. For example, two-dimensional textured objects (such as discs) can be sampled from a shape and size distribution and placed into an image at random positions. The two-dimensional textured objects can be placed into the image such that various two-dimensional textured objects occlude one another. This type of approach provides a natural tool to study occlusion phenomena, which is often useful or important in the formation of visual images.

As shown in FIG. 6, the architecture 600 receives an image size 602 as an input. The image size 602 can define the desired or required size of the synthetic ground truth images 210 to be created using the architecture 600. In some cases, for instance, the image size 602 can define the horizontal resolution in pixels (referred to as in) and vertical resolution in pixels (referred to as n) of the synthetic ground truth images 210 to be created. The image size 602 may be obtained from any suitable source, such as a user.

The image size 602 is provided to a sample radius determination function 604, which identifies minimum and maximum sizes (such as minimum and maximum radii) of random discs to be used as "leaves" when generating synthetic ground truth images. Any suitable techniques may be used to identify the minimum and maximum sizes of the random discs. In some cases, for instance, the maximum size may have a value of one, which indicates that a disc can fill the entire space horizontally, vertically, or both within a synthetic ground truth image. Also, in some cases, the minimum size may have a value of $3/\max(m,n)$. However, any other suitable values may be used here as the minimum and maximum sizes.

A disc radius determination function 606 uses the minimum and maximum disc sizes (as determined by the sample radius determination function 604) and randomly selects disc sizes for use in generating a specific ground truth image. For example, the disc radius determination function 606 may use a uniform distribution of sizes between the minimum and maximum disc sizes and randomly select a disc size for use at a specific location (x,y) within a ground truth image being generated. This can be repeated for any number of specific locations within the ground truth image being generated, and the values of x and y can also be randomly selected (such as based on uniform distributions in the ranges $1 \leq x \leq m$ and $1 \leq y \leq n$). This allows for the selection of random disc sizes at random locations with the specific ground truth image being generated.

A sample color determination function 608 determines what colors are applied to the random discs generated by the disc radius determination function 606. For example, the sample color determination function 608 may obtain at least one image 610 of a natural scene, such as an image of actual dead leaves or some other image containing various colors. The sample color determination function 608 can determine a distribution of colors in different images 610 or in different portions of the same image 610, such as by generating histograms of the color distributions. The image(s) 610 may be obtained from any suitable source(s), such as a public or private repository containing images of natural scenes (likes scenes containing mountains, lakes, forests, human-made structures, combinations thereof, etc.). As a particular example, the sample color determination function 608 could determine a distribution of colors in one or more images 610 and randomly select colors from the identified distribution for the random discs generated by the disc radius determination function 606. In this way, the sample color determination function 608 can help to replicate natural color distributions within the ground truth images being generated using natural image samples.

A texture addition function 612 determines what textures are applied to the random discs generated by the disc radius determination function 606. For example, the texture addition function 612 may randomly select a texture from a given set of textures for each random disc generated by the disc radius determination function 606. As a particular example, the texture addition function 612 may randomly select a texture from the Brodatz texture set (a public dataset of various textures in grayscale images) or other set, and the selected textures can be alpha-blended or otherwise applied to the random discs generated by the disc radius determination function 606.

The functions 604, 606, 608, and 612 can be repeated one or more times if necessary. For example, in some cases, the functions 604, 606, 608, and 612 may be repeated until an entire image is filled with colored and textured discs. A noise addition function 614 can add noise to the image, where the noise is defined using a noise model 616. The noise model 616 may be used to define any suitable type(s) and level(s) of noise to be added to an image, such as Poisson noise. The noise addition function 614 can therefore add random noise and random amounts of noise to the ground truth images being created, such as to simulate sensor noise generated during operation of one or more imaging sensors. The resulting image represents a dead leaves image 618, which may be used on one of the ground truth images 210. The architecture 600 may repeat this process any suitable number of times to produce any suitable number of dead leaves images 618. Note that if the dead leaves images 618 are generated using certain data value types (such as 8-bit or 16-bit unsigned integers), pixel values of the dead leaves images 618 may be used directly without scaling. If other data value types are used in the dead leaves images 618, scaling may occur prior to usage of the dead leaves images 618.

The use of a dead leaves model to produce ground truth images 210 may provide various benefits. For example, a dead leaves model can be used to produce images having natural image statistics since the statistics (such as color distributions) of one or more natural images 610 can be used when generating the dead leaves images 618. Also, a dead leaves model can provide scale invariance, which means that downscaling and upscaling of image sizes may result in pattern changes but little or no statistic changes. Thus, for instance, the dead leaves images 618 can have similar marginal and bivariate statistics as natural images. In addition, the pattern statistics may be generally invariant to magnification, cropping, or pixel dimensions. However, as noted above, other techniques may be used to produce the ground truth images 210, such as when the ground truth images 210 are generated using one or more generative adversarial networks, generated using one or more transformer-based neural networks, or generated by performing random natural object and background fusion. This disclosure is not limited to the generation of ground truth images 210 using a dead leaves model.

It should be noted that the functions shown in or described with respect to FIG. 6 can be implemented in an electronic device 101, server 106, or other device in any suitable manner. For example, in some embodiments, at least some of the functions shown in or described with respect to FIG. 6 can be implemented or supported using one or more software applications or other software instructions that are executed by the processor 120 of the electronic device 101, server 106, or other device. In other embodiments, at least some of the functions shown in or described with respect to FIG. 6 can be implemented or supported using dedicated hardware components. In general, the functions shown in or described with respect to FIG. 6 can be performed using any suitable hardware or any suitable combination of hardware and software/firmware instructions. Also, the functions shown in or described with respect to FIG. 6 can be performed by a single device or by multiple devices.

Although FIG. 6 illustrates one example of an architecture 600 for generating synthetic ground truth images using a dead leaves model, various changes may be made to FIG. 6. For example, various components in FIG. 6 may be combined, further subdivided, replicated, or rearranged and additional components may be added according to particular needs. Also, any suitable number of dead leaves images 618 may be produced here and used for machine learning model training.

Figure 7A:
FIGS. 7A and 7B illustrate an example natural image and an example synthetic ground truth image generated using a dead leaves model in accordance with this disclosure.
Figure 7B:
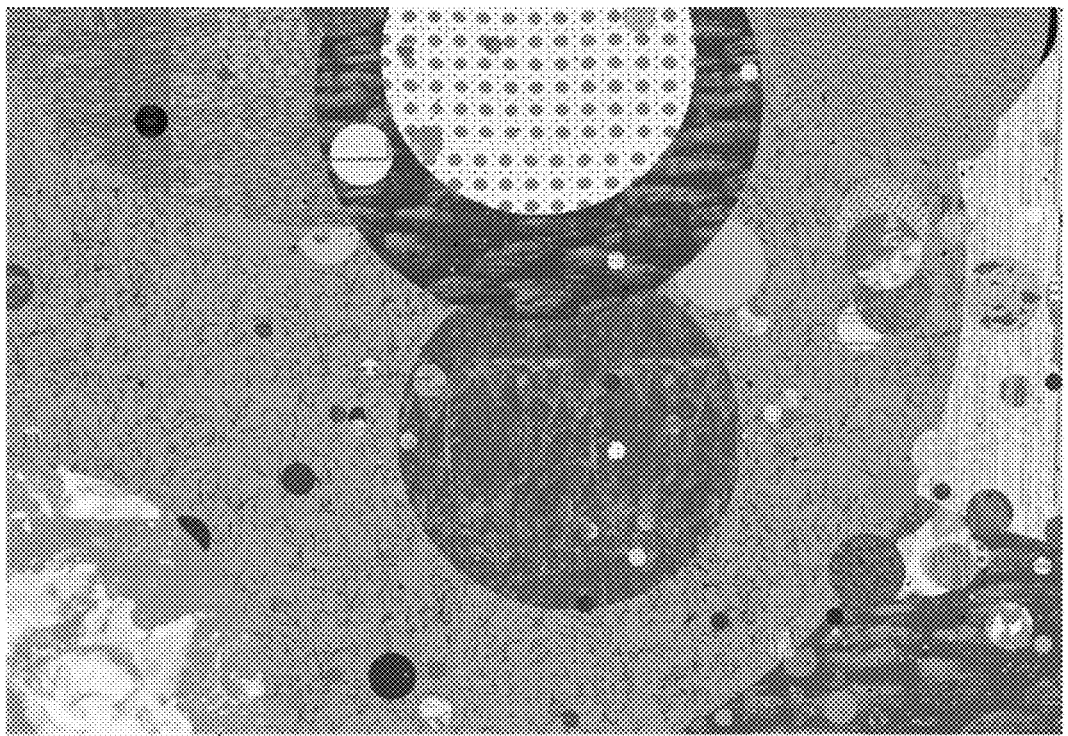

FIGS. 7A and 7B illustrate an example natural image 702 and an example synthetic ground truth image 704 generated using a dead leaves model in accordance with this disclosure. For example, the natural image 702 may represent an example of a natural image 610 obtained and used by the architecture 600, and the synthetic ground truth image 704 may represent an example of a dead leaves image 618 generated by the architecture 600.

As can be seen in FIG. 7A, the natural image 702 represents an image of actual dead or dying leaves. In this example, the leaves in the natural image 702 can have a random assortment of sizes, shapes, colors, and textures. Also, various leaves can occlude other leaves. Similarly, as can be seen in FIG. 7B, the synthetic ground truth image 704 represents a synthetic image containing a number of circular discs, where the discs can have a random assortment of sizes, shapes, colors, and textures. Also, various discs can occlude other discs. In this example, the colors of the discs in the synthetic ground truth image 704 of FIG. 7B can be randomly selected, such as from a distribution of the colors contained in the natural image 702 of FIG. 7A.

Although FIGS. 7A and 7B illustrate one example of a natural image 702 and one example of a synthetic ground truth image 704 generated using a dead leaves model, various changes may be made to FIGS. 7A and 7B. For example, any other suitable natural image or images may be obtained by the architecture 600 and used during the generation of the dead leaves image 618. Also, the contents of the dead leaves image 618 can easily vary given the random nature of the image generation process.

Figure 8B:
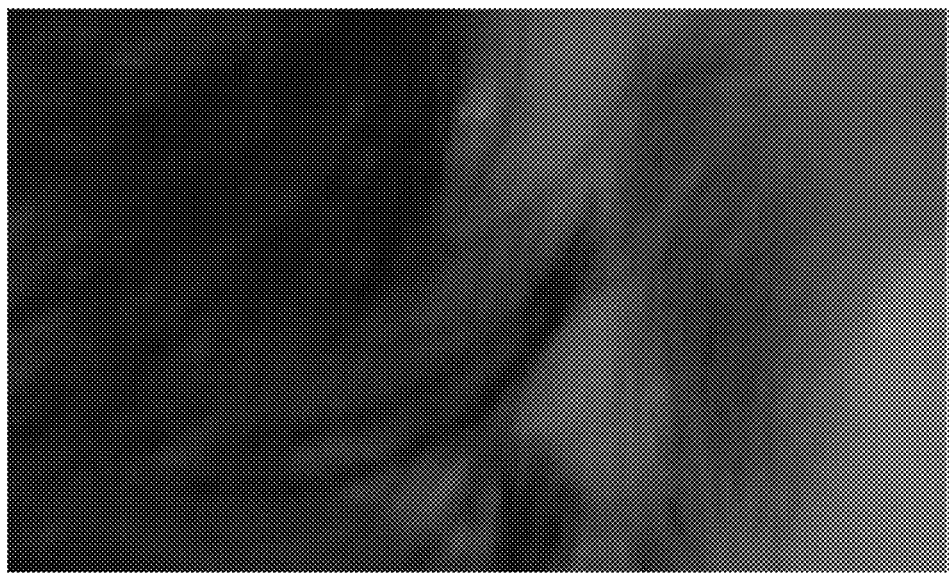
FIGS. 8A and 8B illustrate example results obtained using a machine learning model trained to perform UDC image restoration in accordance with this disclosure.
Figure 8A:
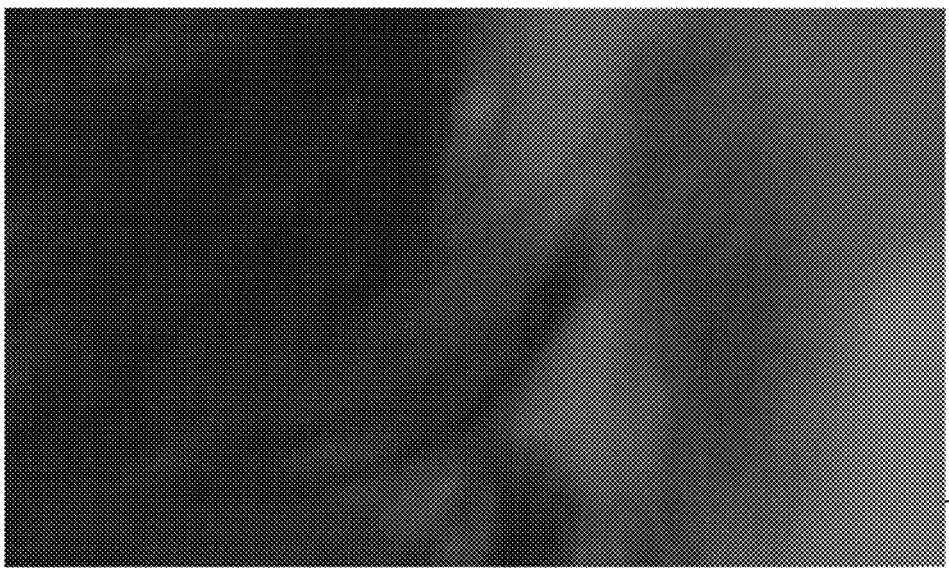

FIGS. 8A and 8B illustrate example results obtained using a machine learning model trained to perform UDC image restoration in accordance with this disclosure. For example, the machine learning model may be trained using the architecture 200 shown in FIG. 2 and described above. In FIG. 8A, a portion of an image 802 captures part of a person's face, including an eyebrow above one of the person's eyes. The image 802 may, for example, represent a blurred image captured using an under-display camera. The image 802 here contains a relatively large amount of blur, which causes finer details in the image 802 to become lost.

In FIG. 8B, an image 804 of the same part of the person's face is shown. The image 804 may, for example, represent a sharpened output image generated using a trained machine learning model 220. As can be seen here, the image 804 is sharper, and at least a significant portion of the blur contained in the original image 802 has been removed in the image 804. As a result, the image 804 shows finer details of the scene that might otherwise be lost due to the presence of the blur, such as individual hairs in the person's eyebrow. Thus, it is possible to train a machine learning model 220 to perform UDC image restoration using partially- or completely-synthetic training data in the training dataset 216 and still achieve good results using the trained machine learning model 220. In some cases, a machine learning model 220 that is trained using completely-synthetic training data in the training dataset 216 may achieve comparable or even better results compared to machine learning models trained using actual images of real-world scenes.

Although FIGS. 8A and 8B illustrate one example of results obtained using a machine learning model trained to perform UDC image restoration, various changes may be made to FIGS. 8A and 8B. For example, images of scenes can vary widely, and the blur contained in the images can also vary based on the circumstances. As a result, FIGS. 8A and 8B are merely meant to illustrate one example of the type of results that could be obtained using the approaches described in this disclosure. However, FIGS. 8A and 8B do not limit the scope of this disclosure to any particular type of results.

Figure 9:
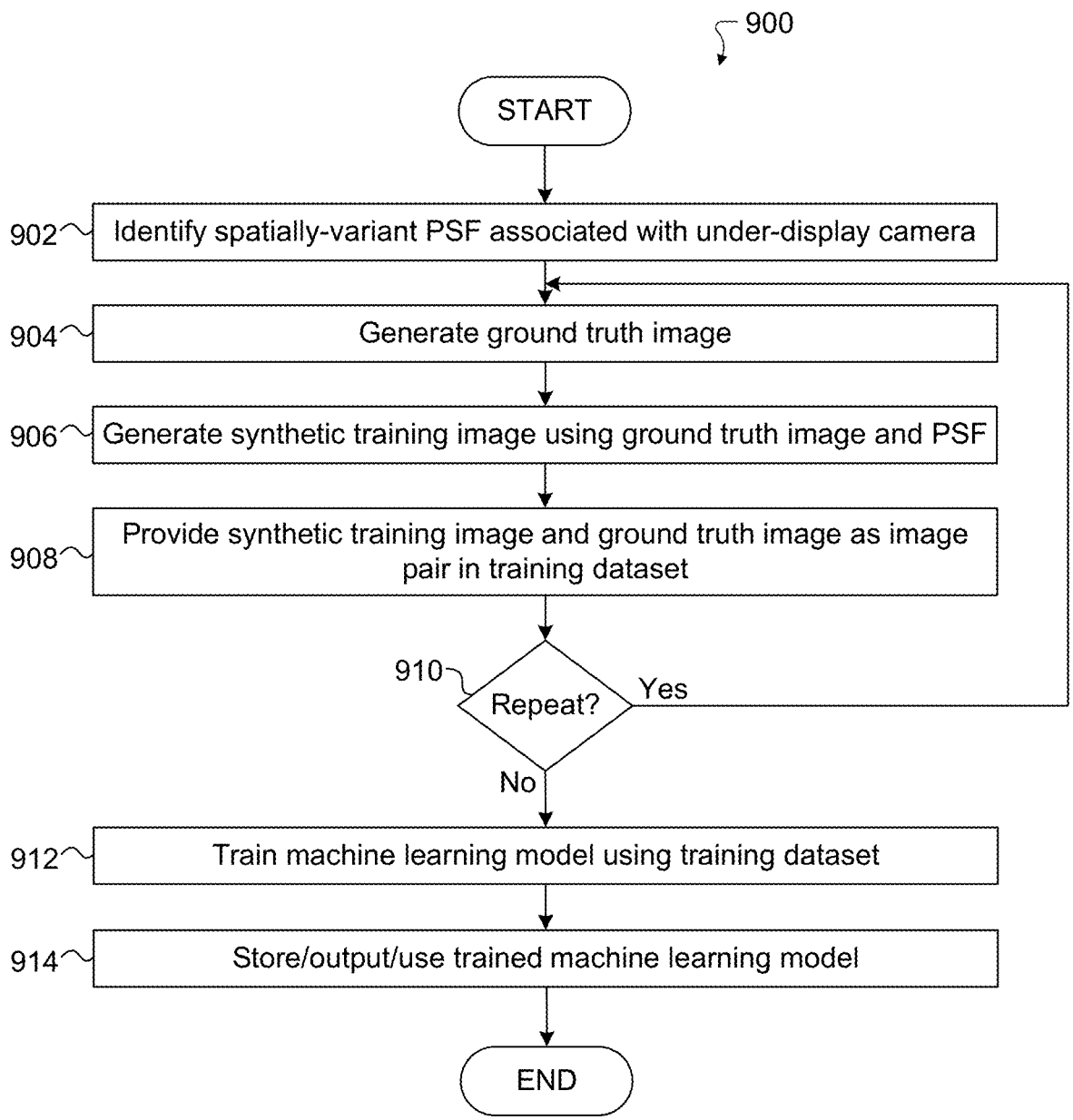
FIG. 9 illustrates an example method for generating training data and training a machine learning model to perform UDC image restoration in accordance with this disclosure.

FIG. 9 illustrates an example method 900 for generating training data and training a machine learning model to perform UDC image restoration in accordance with this disclosure. For ease of explanation, the method 900 shown in FIG. 9 is described as being performed by the server 106 in the network configuration 100 of FIG. 1, where the server 106 may implement the architectures 200 and 600 shown in FIGS. 2 and 6. However, the method 900 shown in FIG. 9 could be used with any other suitable device(s) and in any other suitable system(s), such as when the method 900 is performed by the electronic device 101.

As shown in FIG. 9, a spatially-variant point spread function associated with an under-display camera is identified at step 902. This may include, for example, the processor 120 of the server 106 performing the PSF simulation function 204 using one or more display parameters 202 (such as an image of a repeating display grid pattern in a display to be used with the under-display camera and a size of the display grid pattern) and an optical transmission model that models an under-display camera (such as by using a lens 310 and an imaging sensor 312). The PSF simulation function 204 can generate a simulated point spread function 206 that defines how images may be blurred when light passes through the display and the under-display camera.

A ground truth image is generated at step 904. This may include, for example, the processor 120 of the server 106 performing the synthetic image generation function 208 in order to generate a ground truth image 210. As a particular example, this may include the processor 120 of the server 106 using a dead leaves model and at least one natural image 610 to generate a dead leaves image 618 containing various discs (some occluding others) with random colors and textures. A synthetic training image is generated using the ground truth image and the spatially-variant point spread function at step 906. This may include, for example, the processor 120 of the server 106 performing the synthetic image generation function 212 to apply one or more convolutions to the ground truth image 210 based on the simulated point spread function 206 in order to generate a training image 214. The synthetic training image and the ground truth image are provided as an image pair in a training dataset at step 908. This may include, for example, the processor 120 of the server 106 storing the training image 214 and the ground truth image 210 in the training dataset 216 for use during machine learning model training. A determination is made whether to repeat certain operations and generate one or more additional image pairs at step 910. This may include, for example, the processor 120 of the server 106 determining whether a desired number of image pairs have been produced for the training dataset 216. If not, the process returns to step 904 to generate an additional image pair.

Otherwise, a machine learning model is trained using the training dataset at step 912. This may include, for example, the processor 120 of the server 106 performing the model training function 218 in order to train at least one machine learning model 220 using the training dataset 216. As a particular example, this may include the processor 120 of the server 106 iteratively (i) providing the training images 214 to the machine learning model being trained, (ii) obtaining output images from the machine learning model based on the training images 214, (iii) comparing the output images to the ground truth images 210, (iv) calculating one or more loss values based on differences/errors between the output images and the ground truth images 210, and (v) adjusting weights or other parameters of the machine learning model to try and reduce the loss value(s). Once training is completed, the trained machine learning model is stored, output, or used at step 914. This may include, for example, the processor 120 of the server 106 providing the trained machine learning model 220 to one or more electronic devices (such as the electronic device 101) for use in processing images from under-display cameras.

Although FIG. 9 illustrates one example of a method 900 for generating training data and training a machine learning model to perform UDC image restoration, various changes may be made to FIG. 9. For example, while shown as a series of steps, various steps in FIG. 9 may overlap, occur in parallel, occur in a different order, or occur any number of times.

Figure 10:
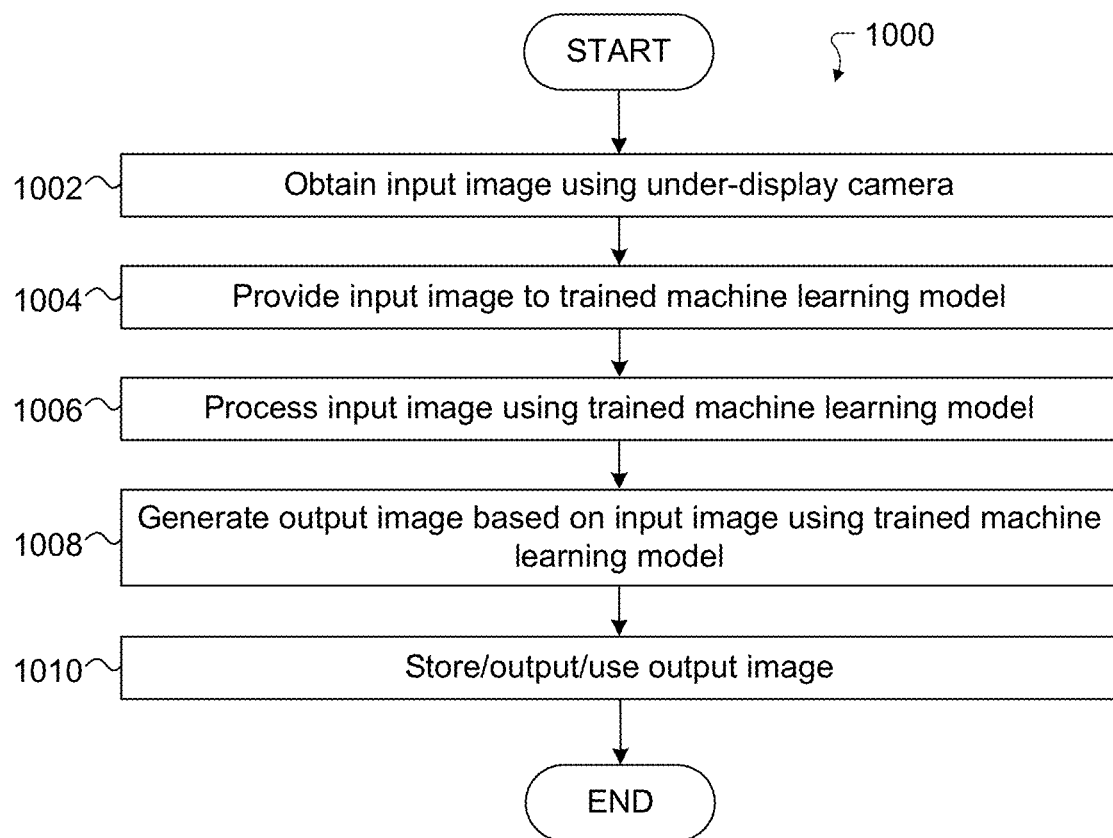
FIG. 10 illustrates an example method for using a trained machine learning model to perform UDC image restoration in accordance with this disclosure.

FIG. 10 illustrates an example method 1000 for using a trained machine learning model to perform UDC image restoration in accordance with this disclosure. For ease of explanation, the method 1000 shown in FIG. 10 is described as being performed by the electronic device 101 in the network configuration 100 of FIG. 1. However, the method 1000 shown in FIG. 10 could be used with any other suitable device(s) and in any other suitable system(s), such as when the method 1000 is performed by the server 106.

As shown in FIG. 10, an input image is obtained using an under-display camera at step 1002. This may include, for example, the processor 120 of the electronic device 101 receiving an image captured using an under-display camera 308. The captured image can contain blur caused by (among other things) optical diffraction and noise due to the presence of the display 306 in front of the under-display camera 308. The input image is provided to a trained machine learning model at step 1004. This may include, for example, the processor 120 of the electronic device 101 providing the image data of the input image as input to the trained machine learning model 220.

The input image is processed using the trained machine learning model at step 1006, and an output image is generated using the trained machine learning model at step 1008. This may include, for example, the processor 120 of the electronic device 101 using the trained machine learning model 220 to reduce or minimize the amount of blur contained in the output image. The output image can be stored, output, or used in some manner at step 1010. This may include, for example, the processor 120 of the electronic device 101 displaying the output image on the display 160, 306 of the electronic device 101. This may also or alternatively include the processor 120 of the electronic device 101 saving the output image to a camera roll stored in a memory 130 of the electronic device 101. This may also or alternatively include the processor 120 of the electronic device 101 attaching the output image to a text message, email, or other communication to be transmitted from the electronic device 101. Of course, the output image could be used in any other or additional manner.

Although FIG. 10 illustrates one example of a method 1000 for using a trained machine learning model to perform UDC image restoration, various changes may be made to FIG. 10. For example, while shown as a series of steps, various steps in FIG. 10 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    identifying, using at least one processing device of an electronic device, a spatially-variant point spread function associated with an under-display camera, the spatially-variant point spread function based on an optical transmission model and a layout of a display associated with the under-display camera;
    generating, using the at least one processing device, a synthetic ground truth image using a dead leaves model and at least one natural image;
    performing, using the at least one processing device, a convolution of the synthetic ground truth image based on the spatially-variant point spread function in order to generate a synthetic sensor image, the synthetic sensor image representing a simulated image captured by the under-display camera; and
    providing, using the at least one processing device, the synthetic sensor image and the synthetic ground truth image as an image pair to train a machine learning model to perform under-display camera point spread function inversion.

2. The method of claim 1, wherein:
    leaves associated with the dead leaves model are approximated in the synthetic ground truth image using circular discs with random textures; and
    one or more color distributions of the leaves associated with the dead leaves model are based on one or more natural color distributions of natural image samples from the at least one natural image.

3. The method of claim 1, wherein:
    the optical transmission model models the under-display camera using a lens and an imaging sensor; and
    the spatially-variant point spread function varies based on (i) a first distance between the display and the lens and (ii) a second distance between the lens and the imaging sensor.

4. A method comprising:
    identifying, using at least one processing device of an electronic device, a spatially-variant point spread function associated with an under-display camera, the spatially-variant point spread function based on an optical transmission model and a layout of a display associated with the under-display camera;
    generating, using the at least one processing device, a ground truth image;
    performing, using the at least one processing device, a convolution of the ground truth image based on the spatially-variant point spread function in order to generate a synthetic sensor image, the synthetic sensor image representing a simulated image captured by the under-display camera; and
    providing, using the at least one processing device, the synthetic sensor image and the ground truth image as an image pair to train a machine learning model to perform under-display camera point spread function inversion;
    wherein the optical transmission model models the under-display camera using a lens and an imaging sensor;
    wherein the spatially-variant point spread function varies based on (i) a first distance between the display and the lens and (ii) a second distance between the lens and the imaging sensor;
    wherein identifying the spatially-variant point spread function comprises using the optical transmission model and a simulated point source that is temporally and spatially incoherent while assuming that the display associated with the under-display camera has zero thickness; and
    wherein the spatially-variant point spread function is determined using an absolute square of a wavefront of light from the simulated point source passing through the display and the lens and striking the imaging sensor.

5. The method of claim 4, wherein identifying the spatially-variant point spread function further comprises:
    obtaining an image file representing a grid of the display; and
    using a repeating pattern of the grid to represent the display.

6. The method of claim 1, further comprising:
    training the machine learning model to perform the under-display camera point spread function inversion using multiple synthetic sensor images and associated synthetic ground truth images.

7. An apparatus comprising:
    at least one processing device configured to:
        identify a spatially-variant point spread function associated with an under-display camera, the spatially-variant point spread function based on an optical transmission model and a layout of a display associated with the under-display camera;
generate a synthetic ground truth image using a dead leaves model and at least one natural image;
perform a convolution of the synthetic ground truth image based on the spatially-variant point spread function in order to generate a synthetic sensor image, the synthetic sensor image representing a simulated image captured by the under-display camera; and
provide the synthetic sensor image and the synthetic ground truth image as an image pair to train a machine learning model to perform under-display camera point spread function inversion.

8. The apparatus of claim 7, wherein:
the at least one processing device is configured to approximate leaves associated with the dead leaves model in the synthetic ground truth image using circular discs with random textures; and
one or more color distributions of the leaves associated with the dead leaves model are based on one or more natural color distributions of natural image samples from the at least one natural image.

9. The apparatus of claim 7, wherein:
the optical transmission model models the under-display camera using a lens and an imaging sensor; and
the spatially-variant point spread function varies based on (i) a first distance between the display and the lens and (ii) a second distance between the lens and the imaging sensor.

10. The apparatus of claim 9, wherein:
to identify the spatially-variant point spread function, the at least one processing device is configured to use the optical transmission model and a simulated point source that is temporally and spatially incoherent while assuming that the display associated with the under-display camera has zero thickness; and
the at least one processing device is configured to determine the spatially-variant point spread function using an absolute square of a wavefront of light from the simulated point source passing through the display and the lens and striking the imaging sensor.

11. The apparatus of claim 10, wherein, to identify the spatially-variant point spread function, the at least one processing device is further configured to:
obtain an image file representing a grid of the display; and
use a repeating pattern of the grid to represent the display.

12. The apparatus of claim 7, wherein the at least one processing device is further configured to train the machine learning model to perform the under-display camera point spread function inversion using multiple synthetic sensor images and associated synthetic ground truth images.

13. A non-transitory computer readable medium containing instructions that when executed cause at least one processor to:
identify a spatially-variant point spread function associated with an under-display camera, the spatially-variant point spread function based on an optical transmission model and a layout of a display associated with the under-display camera;
generate a synthetic ground truth image using a dead leaves model and at least one natural image;
perform a convolution of the synthetic ground truth image based on the spatially-variant point spread function in order to generate a synthetic sensor image, the synthetic sensor image representing a simulated image captured by the under-display camera; and
provide the synthetic sensor image and the synthetic ground truth image as an image pair to train a machine learning model to perform under-display camera point spread function inversion.

14. The non-transitory computer readable medium of claim 13, wherein:
the instructions when executed cause the at least one processor to approximate leaves associated with the dead leaves model in the synthetic ground truth image using circular discs with random textures; and
one or more color distributions of the leaves associated with the dead leaves model are based on one or more natural color distributions of natural image samples from the at least one natural image.

15. The non-transitory computer readable medium of claim 13, wherein:
the optical transmission model models the under-display camera using a lens and an imaging sensor;
the spatially-variant point spread function varies based on (i) a first distance between the display and the lens and (ii) a second distance between the lens and the imaging sensor;
the instructions that when executed cause the at least one processor to identify the spatially-variant point spread function comprise:
instructions that when executed cause the at least one processor to use the optical transmission model and a simulated point source that is temporally and spatially incoherent while assuming that the display associated with the under-display camera has zero thickness; and
the spatially-variant point spread function is based on an absolute square of a wavefront of light from the simulated point source passing through the display and the lens and striking the imaging sensor.

16. The non-transitory computer readable medium of claim 15, wherein the instructions that when executed cause the at least one processor to identify the spatially-variant point spread function further comprise:
instructions that when executed cause the at least one processor to:
obtain an image file representing a grid of the display; and
use a repeating pattern of the grid to represent the display.

17. The non-transitory computer readable medium of claim 13, further containing instructions that when executed cause the at least one processor to train the machine learning model to perform the under-display camera point spread function inversion using multiple synthetic sensor images and associated synthetic ground truth images.

18. A method comprising:
obtaining, using at least one processing device of an electronic device, an input image captured by an under-display camera; and
processing, using the at least one processing device, the input image using a trained machine learning model to reduce blur and generate an output image based on the input image;
wherein the trained machine learning model is trained to perform an under-display camera point spread function inversion using an image pair comprising (i) a synthetic ground truth image and (ii) a synthetic sensor image generated by performing a convolution of the synthetic ground truth image based on a spatially-variant point spread function, the spatially-variant point spread function based on an optical transmission model and a layout of a display positioned over the under-display camera; and wherein the synthetic ground truth image is generated using a dead leaves model and at least one natural image.

19. The method of claim 18, wherein:

leaves associated with the dead leaves model are approximated in the synthetic ground truth image using circular discs with random textures; and one or more color distributions of the leaves associated with the dead leaves model are based on one or more natural color distributions of natural image samples from the at least one natural image.

20. The method of claim 18, wherein the spatially-variant point spread function at least partially accounts for a non-uniform modification of light captured by the under-display camera after passage of the light through the display positioned over the under-display camera.

21. The method of claim 18, wherein the synthetic sensor image is generated using an image file representing a repeating grid of the display positioned over the under-display camera.

22. The method of claim 18, wherein the trained machine learning model is trained to perform the under-display camera point spread function inversion using multiple synthetic sensor images and associated synthetic ground truth images.

* * * * *